United States Patent [19]

Fine

[11] Patent Number: 4,513,590

[45] Date of Patent: Apr. 30, 1985

[54] COMBINATION FILTER APPARATUS FOR USE WITH A DRY CLEANING MACHINE

[75] Inventor: Max Fine, Tamarac, Fla.

[73] Assignee: Dual Filtrex, Inc., Tamarac, Fla.

[21] Appl. No.: 472,863

[22] Filed: Mar. 8, 1983

[51] Int. Cl.³ .......................... D06F 43/08; B01D 5/00
[52] U.S. Cl. .................................... 68/18 C; 68/18 F; 34/80; 210/409
[58] Field of Search .................... 68/18 R, 18 C, 18 F; 34/80, 82; 210/167, 410, 409, 770, 771, 791, 798; 55/54

[56] References Cited

U.S. PATENT DOCUMENTS

| | | | |
|---|---|---|---|
| 2,114,776 | 4/1938 | Davis | 68/18 R |
| 2,301,803 | 11/1942 | Davis | 210/771 |
| 2,656,696 | 10/1953 | McDonald | 68/18 R |
| 2,660,869 | 12/1953 | McDonald | 68/18 R |
| 2,828,862 | 4/1958 | Johnson | 210/167 X |
| 3,206,950 | 9/1965 | Xeros | 68/18 R X |
| 3,692,178 | 9/1972 | Reece | 210/798 |

FOREIGN PATENT DOCUMENTS

| | | | |
|---|---|---|---|
| 739683 | 8/1966 | Canada | 68/18 R |
| 1351302 | 4/1974 | United Kingdom | 210/771 |
| 1408263 | 10/1975 | United Kingdom | 68/18 C |

Primary Examiner—Philip R. Coe
Assistant Examiner—Frankie L. Stinson
Attorney, Agent, or Firm—Robert E. Burns; Emmanuel J. Lobato; Bruce L. Adams

[57] ABSTRACT

Apparatus for use in a dry cleaning plant having dry cleaning machines using a liquid solvent comprises a plurality of filter cartridge housings, an adsorber containing a bed of activated carbon pellets, a condenser and a solvent-water separator all mounted on a still housing. Valve-controlled conduits are provided for selectively circulating solvent through filter cartridge in said cartridge housings, draining the filter cartridges, connecting cartridge housings to the adsorber to desorb filter cartridges, supplying steam to cartridge housing to strip filter cartridges of solvent, passing air containing solvent vapor through the adsorber to remove the solvent vapor from the air, supplying steam to the adsorber to desorb the carbon bed and supplying steam to a heating coil in the still to distill solvent. Solvent vapor and steam from filter cartridge stripping, desorbing the adsorber, and distillation of the solvent are condensed in the condenser and the resulting condensate flows to the solvent-water separator where the solvent is separated from water.

15 Claims, 3 Drawing Figures

COMBINATION FILTER APPARATUS FOR USE WITH A DRY CLEANING MACHINE

FIELD OF INVENTION

The present invention relates to equipment for use in dry cleaning plants and in particular, to apparatus for filtering and otherwise dealing with the solvent used in dry cleaning machines.

BACKGROUND OF THE INVENTION

In a dry cleaning plant, clothes and other fabric articles are cleaned in machines using a dry cleaning solvent for example perchlorethylene which is commonly referred to as "perc". When the solvent has been used for cleaning, it must be filtered to remove dirt, lint and other contaminants, the filtered solvent being returned to the machine. Filtering is customarily effected by apparatus using filter cartridges through which the solvent is passed. After filter cartridges have been used for a period of time, they must be replaced. However, before being discarded, the used cartridges must be stripped of solvent remaining in them not only to conserve the solvent but further because environmental restrictions prohibit the disposal of filter cartridges containing solvent.

Even though it is continually filtered, the solvent must be periodically distilled in order to remove impurities that are not removed by filtering. In the distillation process, the solvent is in effect boiled or vaporized. The solvent vapor—usually together with steam—is thereupon condensed and the water and solvent of the resulting condensate are separated from one another by gravity since the solvent is heavier than water.

A further problem that arises in dry cleaning plants is the control of vapor or fumes from the volatile solvent. After clothes or other articles have been dry cleaned, they are tumbled in a drying tumber or reclaimer with hot air to remove most of the solvent from the garments. The air from the tumbler or reclaimer containing residual solvent vapor cannot be discharged into the atmosphere, not only because of pollution problems, but also because this would result in an unacceptable loss of solvent. It is therefore a passed through an adsorber comprising a housing containing activated carbon pellets which adsorb the solvent. After the carbon pellets have become saturated with solvent, they are desorbed by passing steam through the adsorber to drive off solvent, the resulting vapor together with the steam being condensed in a condenser and the condensate being thereafter fed to a solvent-water separator.

There are presently separate pieces of apparatus for filtering the solvent, stripping filter cartridges, distilling the solvent and adsorbing the solvent vapor. However, the use of such apparatus not only involves considerable purchase, installation and maintenance expense but is also uneconomical of floor space, thereby further increasing the expense of the dry cleaning plant.

SUMMARY OF THE INVENTION

It is an object of the present invention to decrease the expense involved in solvent treatment and handling in a dry cleaning plant by providing a single piece of equipment replacing the multiple pieces of equipment heretofore required.

In accordance with the invention, there is provided a single compact unit performing the functions of filtering the solvent, draining the filter cartridges, desorbing filter cartridges, stripping filter cartridges, distilling used solvent, adsorbing solvent vapor, desorbing the adsorber, condensing solvent vapor resulting from the distillation and desorbing operations and separating condensed solvent from water.

Among the advantages of the apparatus in accordance with the invention are the following:

1. A saving of up to 65% of the space now used by individual units for performing some, but not all of the operation carried out by the apparatus of the invention.

2. Draining and steam stripping filter cartridges in the same housings in which they are used for filtering the solvent.

3. Using a single solvent-water separator instead of the three that are customarily required.

4. Using a single condenser instead of three separate condensors.

5. An increase in efficiency due to short ducts steam, water and solvent lines and reducing waste by using a single solvent-water separator.

6. The saving of solvent from cartridges which were formally drained and discarded.

7. The ability to operate individual parts of the apparatus at the same time despite the fact that they are combined in a single piece of equipment.

BRIEF DESCRIPTION OF DRAWINGS

The nature objects and advantages of invention will be more fully understood from the following description of a preferred embodiment of the invention shown by way of example in the accompanying drawings in which.

DESCRIPTION OF PREFERRED EMBODIMENT

Figure 1:
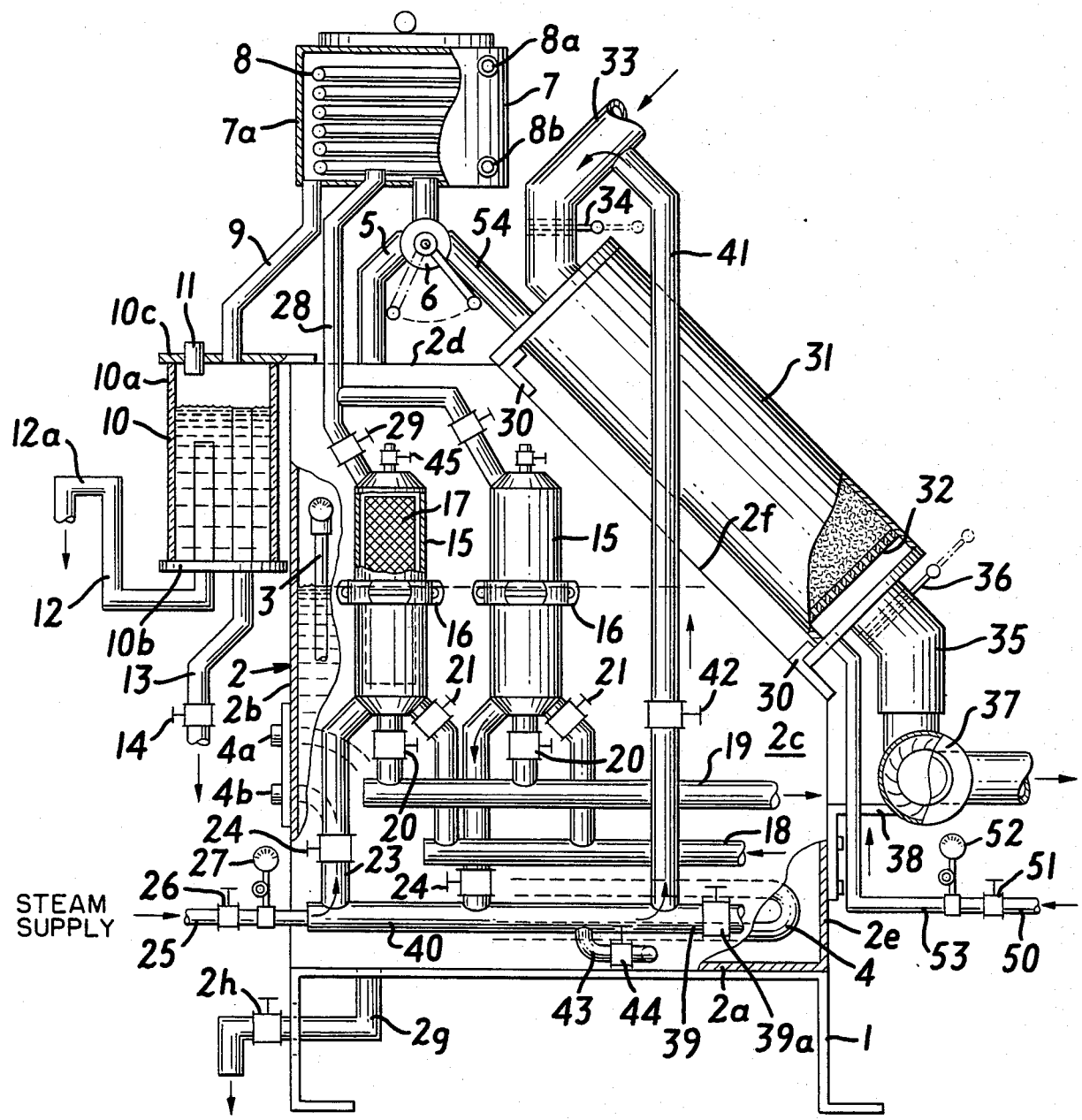
FIG. 1 is a side elevation of apparatus in accordance with the invention with portions broken away to show internal construction.
Figure 2:
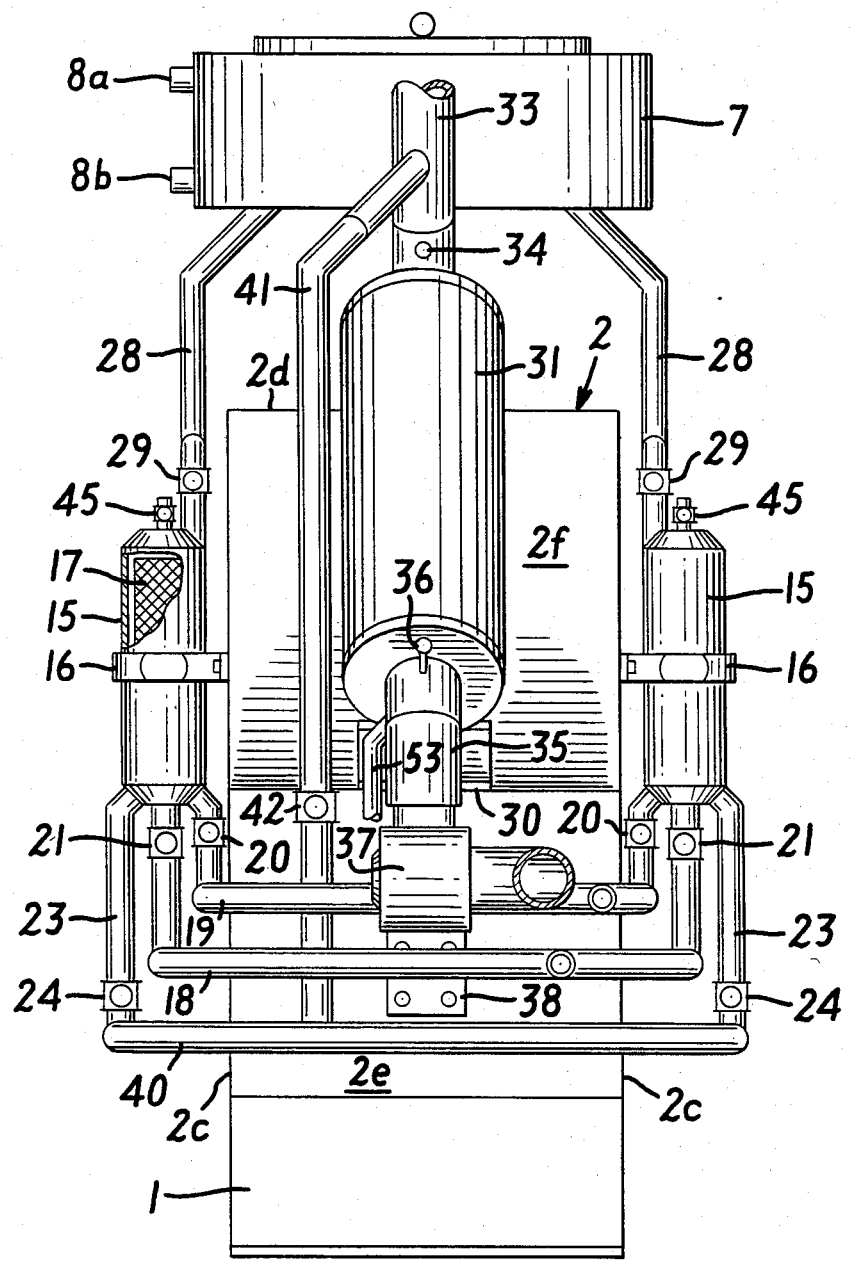
FIG. 2 is a rear elevation with a portion broken away to show internal construction.
Figure 3:
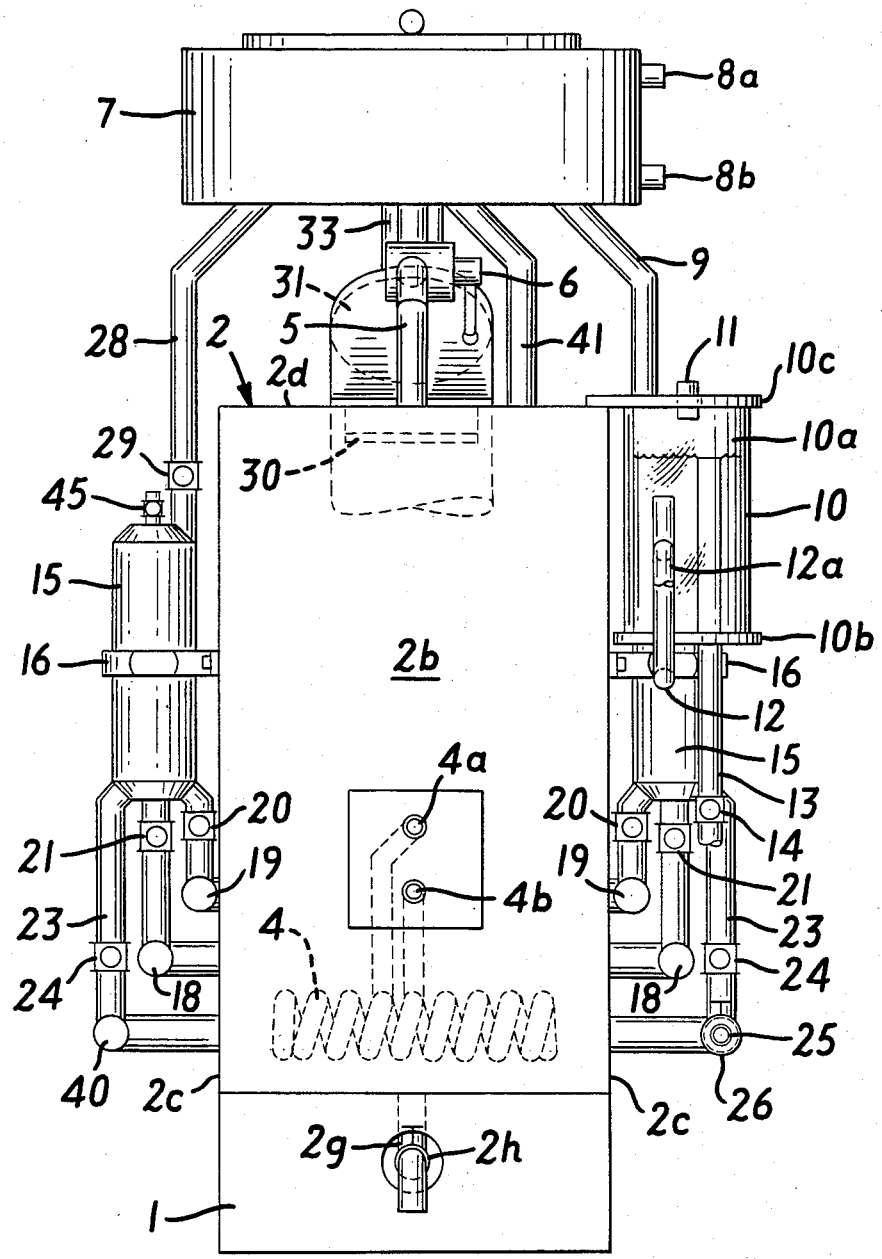
FIG. 3 is a front elevation.

As shown by way of example in the accompanying drawings, apparatus in accordance with the present invention comprises a base 1 on which is mounted a still housing 2. The still is shown as having a bottom 2a, a vertical front wall 2b opposite sides 2c, a top 2d, a vertical rear wall 2e which is lower than the front wall 2b and an inclined rear wall 2f which slopes up to the top 2d. A gauge glass 3 is provided for determining the level of liquid in the still. Solvent in the still is heated to the point of boiling or vaporization by a steam coil 4 to which steam is supplied through pipe connections 4a and 4b for connection to a boiler or other source of steam (not shown). Suitable valves (not shown) are provided in the steam line for controlling the supply of steam to the heating coil 4. A drain 2g controlled by a valve 2h is provided in the bottom of the still.

Solvent vapor resulting from the boiling of solvent in the still 2 is fed through a duct 5 and three-way valve 6 into a condenser 7. The condenser—mounted above the still—comprises a suitable housing 7a containing a cooling coil 8 which is supplied through connections 8a and 8b with refrigerant, cooling water or other cooling fluid to condense the solvent vapor. As the same condenser is also used, in operations described below, to condense a mixture of solvent vapor and water vapor or steam, the condensate is conducted through a conduit 9 to a solvent-water separator 10 which is mounted on an upper portion of the still housing 2. The separator 10 comprises a cylinder 10a of glass or other transparent material mounted between a bottom 10b and a top 10c in which there is provided a vent 11. In the separator, there is provided a solvent discharge pipe 12 and a water discharge pipe 13 controlled by a valve 14. The inner end of the solvent discharge pipe 12 is lower than that of the water discharge pipe 13. As the solvent in this case is heavier than water, the water rises to the top and is discharged through pipe 13 while the solvent is discharged through the lower pipe 12 in which there is provided a goose neck 12a to control the level. Float or other means (not shown) may, if desired, be provided to control the liquid levels in the separator so that solvent is discharged through the pipe 12 and water is discharged through the pipe 13.

On opposite sides of the still 2, a plurality of filter cartridge housings 15 are mounted by means of clamps 16. In the illustrated embodiment there are two cartridge housings mounted on each of opposite sides of the still 2. Each of the housings 15 is of a shape and size to hold a filter cartridge 17. The cartridge housing is provided with a removable lid or otherwise made in such manner that filter cartridges can be inserted and removed. Dirty solvent from a dry cleaning machine is fed to the filter cartridge housings through a line 18 and the clean filtered solvent, after passing through the filter cartridge, is returned to the dry cleaning machine by a line 19. Control valves 20 and 21 are provided in the supply and return lines so that the filters can be used individually as desired.

When it is desired to strip a used filter of solvent before discarding it, steam is admitted to the filter housing through a line 23 controlled by a valve 24 to which steam is supplied by a steam line 25 controlled by a valve 26. A gauge 27 is provided for reading the steam pressure. The steam admitted to the cartridge housing 15 vaporizes the solvent in the cartridge 17 and the resulting steam and solvent vapor are led by a line 28 controlled by a valve 29 to the condenser 7. There the steam and solvent vapor are condensed and the resulting condensate is discharged through conduit 9 to the solvent-water separater 10 where the solvent is separated from the water as described above.

Mounted on the inclined wall 2f of the still housing by means of brackets 30 is a vapor adsorber 31. The vapor adsorber comprises a cylindrical casing in which a bed of activated carbon pellets is confined by means of screens 32 at upper and lower ends of the casing. An inlet line 33 entering the upper end of the adsorber is controlled by a damper 34. A discharge line 35 at the lower end of the adsorber is controlled by a damper 36. The discharge line 35 leads to a suction fan or blower 37 mounted on the rear wall 2e of the still housing by a bracket 38. The inlet line 33 is connected to drying tumblers, dry cleaning machines or other equipment or areas from which it is desired to remove solvent vapor. Upon operation of the blower 37 with the dampers 34 and 36 open, air containing solvent vapor is drawn through the adsorber whereupon the vapor is retained and thereby removed from the air by the activated carbon pellets. Air freed of the solvent vapor is discharged from the blower 37.

In order to recover solvents from used cartridges, the line 23 connected to the bottom of each of the cartridge housings is connected through a line 40 and a line 41 controlled by valve 42 to the inlet line 33 of the adsorber. Moreover, the line 40 is provided with a branch line 43 controlled by a valve 44 through which solvent from the cartridge housing can be drained into the still 2 and is connected with a line 39 controlled by a valve 39a through which solvent can alternatively be drained to a storage tank of a dry cleaning machine. A tent valve 45 is provided at the top of each cartridge housing. If the vent valve 45, the valve 24 in line 23 and the drain valve 44 are opened (valves 20, 21 and 39a being closed) solvent in the cartridge housing will drain into the still. If valve 44 is closed and valve 39a opened, solvent will drain to the storage tank of the dry cleaning machine. If valves 44 and 39a are closed and valve 42 is open—while the adsorber is in operation—air will be drawn through the filter where it will pick up solvent vapor and the resulting air and solvent vapor will be drawn into and through the adsorber 31 where the solvent vapor will be removed as described above.

After the carbon bed in the adsorber 31 has become saturated with solvent, it must be desorbed. To accomplish this, steam for a stream line 50 provided with a valve 51 and a steam gauge 52 is admitted to the lower end of the adsorber through a line 53. The steam heats the carbon bed and thereby vaporizes solvent it contains. The resulting steam and solvent vapor pass through a line 54 and three-way valve 6 to the condenser 7 where the steam and solvent vapor are condensed and the condensate is discharged to the solvent-water separator 10 for separation of the water and solvent as described above.

The different modes of operation of the apparatus will now be described.

Filtering

As each filter cartridge housing is provided with individual valves, it is possible to use one or more filters at a time. For each filter, it is desired to use, the valves 20 and 21 are opened while the corresponding valves of other filter cartridge housings remain closed. Dirty solvent from the dry cleaning machine is pumped through the inlet 18 and the clean (filtered) solvent is returned to the dry cleaning machine through line 19. The process is repeated for a normal dry cleaning cycle. The life of a cartridge is usually limited to a maximum of 1,000 pounds of dry cleaning.

Draining the Cartridge

After a cartridge has been used, valves 24, 39a and vent 45 are opened to permit the solvent to drain back to the machine solvent storage tank by gravity. Also if desired valve 44 can be opened to permit solvent to drain directly into the still.

Cartridge Desorption

After a filter cartridge has been drained, the remaining solvent and vapors can be desorbed by opening the valve 42 (valve 24 and vent 45 remaining open). This will allow air to enter the vent 45 flow through the cartridge where it will pick up solvent vapor and be drawn into the carbon bed of the adsorber 31 through line 41 by the suction blower 37. This can function during the operation of the vapor adsorber while dry cleaning. In fact due to the size and location of the entry of line 41 into line 33, the desorbtion of the filter cartridges will be increased by reason of the Venturi effect caused by the adsorber fan 37.

Cartridge Stripping

E.P.A. rules require all spent cartridges to be void of any solvent. In order to strip a cartridge of solvent, the vent valve 45 is closed (valves 20 and 21 being also closed) and steam is admitted to the cartridge housing from steam line 25 through valves 26 and 24. Valve 29 is opened to permit steam and solvent vapor to flow to the condenser 7 where they are condensed and fed to the solvent-water separator 10 as described above. This operation is continued until virtually all solvent has been removed from the filter cartridge.

It will be understood that since each filter cartridge housing is provided with individual valves, great flexibility of operation of the apparatus is provided. Thus while one or more filter cartridges are being used for filtering another or others can be drained, desorbed and stripped.

Vapor Adsorption

During the dry cleaning operation, residual vapor from the garments will be drawn into and through the adsorber 31 by the suction fan 37, dampers 34 and 36 being in open position. As described above, solvent vapor is adsorbed by the activated carbon pellets whereby vapor free air is discharged by the suction fan 37. It will be noted that the vapor adsorption does not affect the remaining system. Thus distillation, filtration, drainage and cartridge desorption may take place at the same time.

Desorption

In order to effect desorption of the carbon bed, the fan 37 is turned off and dampers 34 and 36 are closed. Steam is then admitted to the adsorber from steam line 50 through valve 51 and line 53. The steam entering the adsorber vaporizes solvent that has been held by the carbon pellets and the resulting solvent vapor and steam are discharged through line 54 and three way valve 6 into the condenser 7. There the solvent vapor and steam are condensed and the condensate drains through line 9 to the solvent-water separater 10. When it has been determined that all of the solvent that can be obtained by such desorption has been obtained, the steam line is closed, the dampers 34 and 36 are opened and the fan 37 is again turned on to resume the adsorbtion process.

Distillation

A desired amount of solvent is fed into the still 2 as determined by the gauge glass 24. Solvent is admitted to the still either through line 39 or 40 and line 43 or by other supply line (not shown). Steam is then supplied to the coil 4 through connections 4a and 4b to heat the solvent to the boiling point. As the solvent boils, the solvent vapor will enter the condenser 7 through line 5 and three-way valve 6. There the solvent vapor will condense and will flow by gravity through line 9 to the solvent-water separator 10. Distilled solvent will be yielded through line 12 and condensed moisture will drain from line 13. After several batches have been distilled, the remaining residue while still warm can be drained from the still by the drain valve 2h.

From the foregoing description will be seen that the apparatus in accordance with the present invention performs all of the required functions with regard to the solvent of a dry cleaning plant. Moreover it will be noted that the same filter cartridge housings can be used for filtering, draining the cartridge, cartridge desorption and cartridge stripping. Moreover, the same condenser and same solvent-water separater are used in cartridge stripping, adsorber desorption, and distillation. The multiple functions of the apparatus makes it possible to obtain important economies not only in the apparatus itself but in the floor space it occupies in a dry cleaning plant.

What is claimed is:

1. Combination filter apparatus for use with a dry cleaning machine using dry cleaning solvent comprising:

steam supply means, condensing means having a cooling coil for condensing water and solvent vapor to convert it from vapor phase to liquid phase, said condensing means having a vapor inlet and a liquid outlet;

solvent-water separator means for separating water from solvent, said separator means having an inlet connected with the outlet of said condensing means, a discharge for water and a separate discharge for solvent, absorption means comprising an absorption housing and a bed of activated carbon pellets in said housing, said housing having an air and vapor inlet, an air outlet, a steam inlet and a vapor outlet, means for passing air containing solvent vapor through said absorber means from said air inlet to said air outlet for removal of solvent vapor from the air by said activated carbon pellets, valve-controlled conduit means for supplying steam to said steam inlet to heat said activated carbon pellets to vaporize absorbed solvent, and valve-controlled conduit means for conducting steam and solvent vapor from said absorption means to said condensing means for condensation therein, a plurality of like filter cartridge housings each of which is of a size and shape removably to receive a filter cartridge and has a dirty solvent inlet, a clean solvent outlet, and a steam inlet and a vapor outlet;

first valve controlled conduit means for selectively conducting dirty solvent from a dry cleaning machine to the dirty solvent inlet of one or more of said filter cartridge housings for passage through a filter cartridge in said housing and for conducting clean solvent from said clean solvent outlet to the dry cleaning machine;

valve controlled drain means at the bottom of each of said filter cartridge housings for draining solvent therein, second valve controlled conduit means for conducting live steam from said steam supply means selectively to said steam inlet of one or more of said filter cartridge housings to vaporize solvent in a filter cartridge therein and for conducting steam and solvent vapor to said vapor inlet of said condensing means and discharge of the resulting solvent and water to said solvent-water separator means for separation of said solvent from said water, said first valve controlled conduit means and second valve controlled conduit means including separate valves for each of said cartridge housings, whereby dirty solvent from said dry cleaning machine can be passed through a filter cartridge in one of said filter cartridge housings simultaneously with steam being conducted to another of said filter cartridge housings to vaporize solvent in a filter cartridge therein, and third valve controlled conduit means for selectively connecting said filter cartridge housings to said air and vapor inlet of said absorption means to draw air containing solvent vapor from said cartridge housings to said absorption means, said cartridge housing having valve-controlled vent openings for admission of air to said filter cartridge housings.

2. Apparatus according to claim 1, further comprising distillation means associated with said cartridge housings, valve controlled conduit means for supplying a selected quantity of solvent to said distillation means, means for heating said solvent in said distillation means to vaporize said solvent, and a valve controlled vapor line for conducting solvent vapor from said distillation means to said condensing means for condensation therein and discharge of the resulting liquid solvent to said solvent-water separator means.

3. Apparatus according to claim 2, in which said heating means comprises a steam coil in said distillation means and means for connecting said coil to said steam supply means.

4. Apparatus according to claim 2, in which there are at least four of said filter cartridge housings with at least two of said filter cartridge housings on each of opposite sides of said distillation means.

5. Apparatus according to claim 2, in which said drain means comprises means for draining solvent from a cartridge therein to said distillation means.

6. Apparatus according to claim 2, in which said valve controlled conduit means for supplying a selected quantity of solvent to said distillation means comprises means for selectively conducting solvent from said cartridge housings to said distillation means and means for conducting solvent from said dry cleaning machine to said distillation means.

7. Apparatus according to claim 1 in which said means for passing air containing solvent vapor through said adsorber means comprises an exhaust fan connected with said air outlet.

8. Combination filter apparatus for use with a dry cleaning machine using dry cleaning solvent comprising:
 a container for solvent, said container having side walls, and a bottom heating means in said container for heating solvent therein to evaporate said solvent, and means at the bottom of said container for withdrawing therefrom residue left by evaporation of said solvent,
 condensing means mounted above said container and comprising a receptacle and a cooling coil in said receptacle, and first valve controlled conduit means for conducting solvent vapor from said container to said condensing means,
 solvent-water separator means mounted on said container below said condensing means and connected with said condensing means to receive condensate therefrom, said separator means having a discharge for water and a separate discharge for solvent,
 a plurality of like filter cartridge housings mounted on side walls of said container, each of said housings being of a size and shape to receive a removable filter cartridge and having a dirty solvent inlet, a clean solvent outlet, a steam inlet, a vapor outlet, a drain and a valve controlled air vent, said air vent being at the top of said housing, said vapor outlet being at the top of said housing and connected by second valve controlled conduit means with said condensing means, and said drain being valve controlled and at the bottom of said housing,
 third valve controlled conduit means connecting said dirty solvent inlet of each of said filter cartridge housings with said dry cleaning machine for conducting dirty solvent from said dry cleaning machine selectively to said filter cartridge housings for filtration by filter cartridges therein,
 fourth valve controlled conduit means connecting said clean solvent outlet of each said filter cartridge housings with said dry cleaning machine for conducting filtered solvent from said filter cartridge housings to said dry cleaning machine,
 valve controlled means for supplying steam selectively to said steam inlets of said filter cartridge housings,
 said third valve controlled conduit means and said fourth valve controlled conduit means including separate valves for each cartridge housing, whereby dirty solvent from said dry cleaning machine can be passed through a filter cartridge in one of said filter cartridge housings for filtering the solvent simultaneously with steam being supplied to another of said filter cartridge housings to vaporize solvent in a filter cartridge therein, and
 absorption means comprising an absorption casing and a bed of activated pellets in said casing, said casing having an air and vapor inlet, and air outlet, means at said air outlet for drawing air and vapor into and through said casing and discharging air therefrom, fifth valve controlled conduit means for individually connecting each of said cartridge housings with the inlet of said absorption means while said air vent of said filter cartridge housing is open to permit air flow through said filter cartridge housing and to and through said absorption means to dry said cartridge.

9. Apparatus according to claim 8, in which said casing of said adsorption means has an upper end at which said inlet is located and a lower end at which said outlet is located, further comprising valve means for closing said inlet and said outlet, valve controlled means connecting the upper end of said casing with said condensing means and valve controlled means for supplying steam to the the lower end of said casing to heat said activated carbon pellets to vaporize adsorbed solvent, the steam and solvent vapor being conducted by said valve controlled means to said condensing means.

10. Apparatus according to claim 9, in which said container has two opposite vertical walls and an inclined wall joining said vertical wall and in which said filter cartridge housings comprises said housings mounted on said vertical walls and said absorption means casing comprises a cylindrical casing mounted in an inclined position on said inclined wall.

11. Apparatus according to claim 8, in which said steam inlet, drain and fifth valve controlled conduit means comprise a single common conduit opening into a lower end of each filter cartridge housing, a valve in said common conduit, a valve controlled steam line connected with said common conduit, a valve controlled drain line connected with said common conduit and a valve controlled line connecting said common conduit with the inlet of said adsorption means.

12. Apparatus according to claim 11, in which said dirty solvent inlet and clean solvent outlet are at a lower end of said filter cartridge housing.

13. Apparatus according to claim 8, in which said third valve controlled conduit means comprises a single common conduit from said dry cleaning machine, a branch conduit from said common conduit to said dirty solvent inlet of each of said filter cartridge housing and a valve in each of said branch conduits.

14. Apparatus according to claim 8, in which said fourth valve controlled conduit means comprises a single common conduit from said apparatus to said dry cleaning machine a branch conduit from said common circuit to said clean solvent outlet of each of said filter cartridge housings and a valve in each of said branch conduits.

15. Apparatus according to claim 8, in which said second valve controlled conduit means comprises a single common conduit connected to said condensing means, a branch conduit from said common conduit to the vapor outlet at the top of each of said filter cartridge housings and a valve in each of said branch conduits.

* * * * *